United States Patent
Hano (10) Patent No.: US 10,651,777 B2
(45) Date of Patent: May 12, 2020

(54) DRIVE APPARATUS AND DRIVE METHOD FOR BRUSHLESS MOTOR

(71) Applicant: Hitachi Automotive Systems, Ltd., Hitachinaka-shi, Ibaraki (JP)

(72) Inventor: Masaki Hano, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 249 days.

(21) Appl. No.: 15/761,215

(22) PCT Filed: Oct. 3, 2017

(86) PCT No.: PCT/JP2017/036000
§ 371 (c)(1),
(2) Date: Mar. 19, 2018

(87) PCT Pub. No.: WO2018/066564
PCT Pub. Date: Apr. 12, 2018

(65) Prior Publication Data
US 2020/0021228 A1    Jan. 16, 2020

(30) Foreign Application Priority Data
Oct. 4, 2016 (JP) .................. 2016-196680

(51) Int. Cl.
*H02P 27/12* (2006.01)
*H02P 21/22* (2016.01)
(Continued)

(52) U.S. Cl.
CPC .............. *H02P 27/12* (2013.01); *F02D 15/02* (2013.01); *H02P 21/22* (2016.02); *H02P 25/03* (2016.02)

(58) Field of Classification Search
USPC .................................................... 318/400.23
See application file for complete search history.

(56) References Cited

U.S. PATENT DOCUMENTS

| 2012/0068643 A1 | 3/2012 | Suzuki |
| 2014/0077733 A1* | 3/2014 | Kashima ................. H02P 27/00 318/400.2 |

(Continued)

FOREIGN PATENT DOCUMENTS

| JP | 2012-65473 A | 3/2012 |
| JP | 2014-168332 A | 9/2014 |
| WO | WO 2010/103565 A1 | 9/2010 |

OTHER PUBLICATIONS

International Preliminary Report on Patentability (PCT/IB/326 & PCT/IB/373) issued in PCT Application No. PCT/JP2017/036000 dated Apr. 18, 2019, including English translation of document C2 (Japanese-language Written Opinion (PCT/ISA/237) previously filed on Mar. 19, 2018) (11 pages).

(Continued)

*Primary Examiner* — Jorge L Carrasquillo
(74) *Attorney, Agent, or Firm* — Crowell & Moring LLP (57) ABSTRACT

A drive apparatus and a drive method for a brushless motor, capable of reducing noise occurring due to pulse shift processing, is provided. The drive apparatus for the brushless motor comprises one shunt resistor and a controller. The shunt resistor measures a phase current of the three-phase brushless motor. The controller measures the phase current of the brushless motor in a one-shunt system by using the shunt resistor, and controls driving of the brushless motor based on the measured phase current. The controller performs pulse shift when a voltage pulse width in a drive wire of the brushless motor is greater than a predetermined value, whereas the controller does not perform the pulse shift when the voltage pulse width is less than the predetermined value.

17 Claims, 8 Drawing Sheets

(51) Int. Cl.
*H02P 25/03* (2016.01)
*F02D 15/02* (2006.01)

(56) References Cited

U.S. PATENT DOCUMENTS

| | | | | |
|---|---|---|---|---|
| 2014/0077738 A1* | 3/2014 | Iwaji | ............... | H02P 27/08 318/400.36 |
| 2014/0239861 A1 | 8/2014 | Ajima et al. | | |
| 2014/0297131 A1* | 10/2014 | Kashima | ............... | B62D 5/046 701/42 |
| 2015/0303844 A1* | 10/2015 | Ajima | ............... | B62D 5/046 318/400.13 |
| 2016/0072421 A1* | 3/2016 | Sugawara | ............... | H02P 6/28 318/400.02 |

OTHER PUBLICATIONS

International Preliminary Report on Patentability (PCT/IB/326 & PCT/IB/373) issued in PCT Application No. PCT/JP2017/036000 dated Apr. 18, 2019, including English translation of document C2 (Japanese-language Written Opinion (PCT/ISA/237) previously filed on May 19, 2018) (11 pages).

Japanese-language International Search Report (PCT/ISA/220 & PCT/ISA/210) issued in PCT Application No. PCT/JP2017/036000 dated Dec. 26, 2017 (four (4) pages).

Japanese-language Written Opinion (PCT/ISA/237) issued in PCT Application No. PCT/JP2017/036000 dated Dec. 26, 2017 with English translation (six (6) pages).

* cited by examiner

DRIVE APPARATUS AND DRIVE METHOD FOR BRUSHLESS MOTOR

TECHNICAL FIELD

The present invention relates to a drive apparatus and a drive method for a brushless motor for use in an electric actuator, an electric pump, and the like.

BACKGROUND ART

Conventionally, a brushless motor is controlled by using a vector control in which the d-axis current and the q-axis current are individually controlled. In the vector control, since the d-axis current is a reactive current component, the d-axis current is normally controlled to be 0 A, and since the q-axis current contributes to the motor torque, a current equivalent to the required torque is given as a command value. To measure the phase current, it is common to use a system in which three shunt resistors are used (three-shunt system) or a system in which one shunt resistor is used (one-shunt system).

Although the former is capable of continuously measuring the phase current, it requires three shunt resistors, resulting in higher costs. On the other hand, the latter requires only one shunt resistor and thus the cost can be low, but the current can be detected only when the voltage pulse is applied. Moreover, if ringing occurs in the phase current at the time of applying the voltage pulse, an accurate current value cannot be acquired until the current stabilizes. Thus, the voltage pulse width (duty width) is restricted.

Thus, for example, Patent Document 1 discloses, in the fourth embodiment, a technique in which the voltage is corrected during a monotonically increasing period of the triangular-wave carrier and subtracted therefrom the correction amount during a following monotonically decreasing period, so that the averaged voltage becomes zero, and then, the current is measured at the timing at which the ringing stops (hereinafter, this technique is referred to as pulse shift).

REFERENCE DOCUMENT LIST

Patent Document

Patent Document 1: WO2010/103565

SUMMARY OF THE INVENTION

Problem to be Solved by the Invention

When the pulse shift is performed to drive a brushless motor in which position control is performed for use in an electric actuator in a variable compression ratio (VCR) engine, for example, there is a possibility of occurrence of unpleasant sound (noise) during maintaining the angle to be constant. This is because the current greatly oscillates (varies) due to the pulse shift. Such noise occurring during the constant-angle control cannot be ignored in a low-noise engine or an engine with a no idling function, and this might be a problem.

The present invention has been made in view of such circumstances, and an object of the present invention is to provide a drive apparatus and a drive method for a brushless motor capable of reducing noise occurring due to pulse shift processing.

Means for Solving the Problem

According to the present invention, a drive apparatus for a three-phase brushless motor, comprises:

a shunt resistor for measuring a phase current of the brushless motor; and a controller that measures the phase current of the brushless motor in a one-shunt system by using the shunt resistor, and controls driving of the brushless motor based on the measured phase current, in which the controller performs pulse shift when a voltage pulse width in a drive wire of the brushless motor is greater than a predetermined value, whereas the controller does not perform the pulse shift when the voltage pulse width is less than the predetermined value.

Furthermore, according to the present invention, a drive method of a three-phase brushless motor by measuring a phase current in a one-shunt system, comprises the steps of:

measuring a voltage pulse width in a drive wire of the brushless motor;

comparing the measured voltage pulse width with a predetermined value; and performing pulse shift when the measured voltage pulse width is greater than the predetermined value, whereas not performing the pulse shift when the measured voltage pulse width is less than the predetermined value.

Effects of the Invention

According to the present invention, since the pulse shift is performed when the voltage pulse width in the drive wire of the brushless motor is greater than the predetermined value, an accurate current value sufficient for use in a vector control can be acquired, and since the pulse shift is not performed when the voltage pulse width is less than the predetermined value, it is possible to reduce noise.

MODE FOR CARRYING OUT THE INVENTION

Hereinbelow, embodiments of the present invention will be described with reference to the accompanying drawings.

Figure 1:
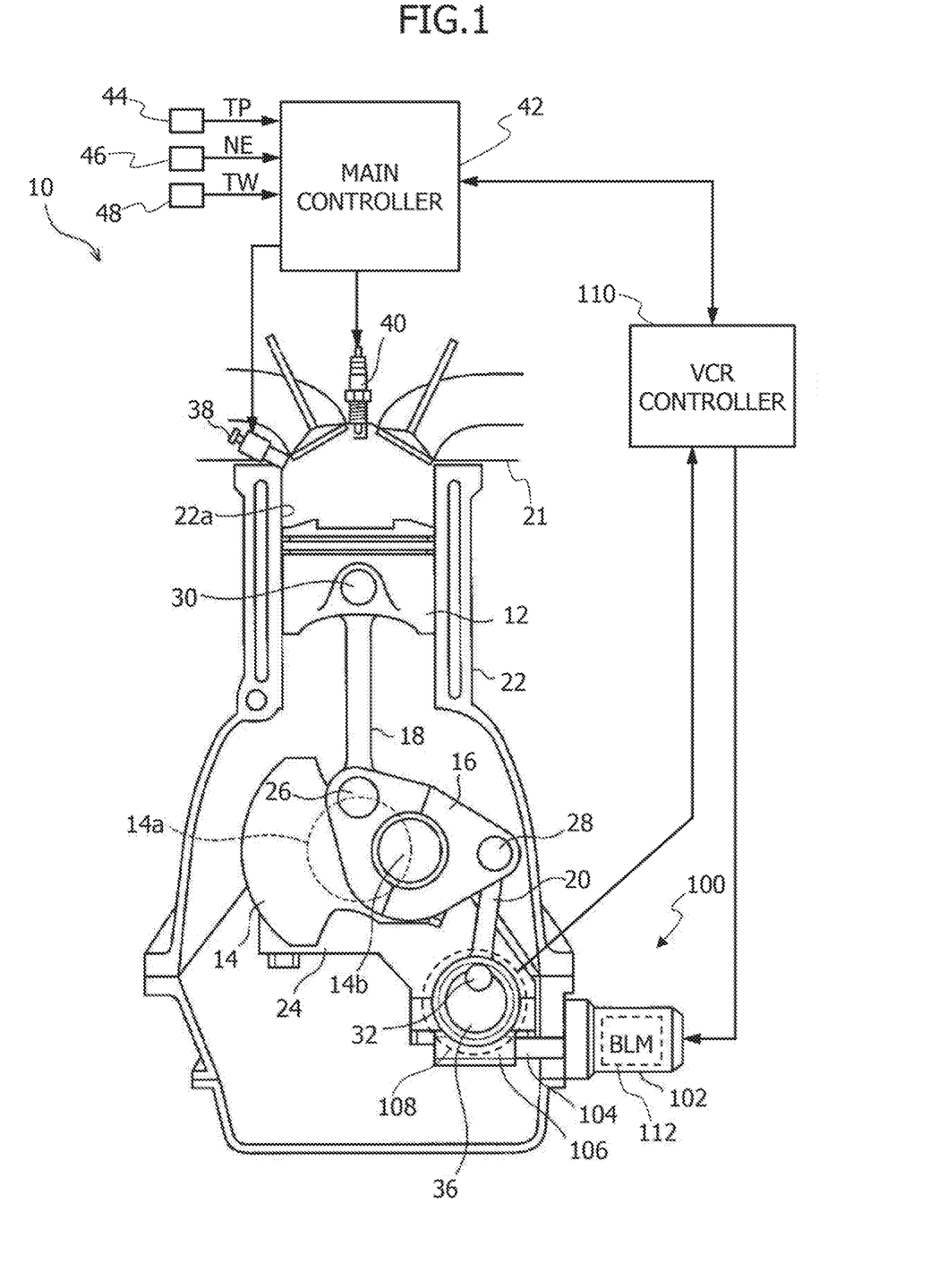
FIG. 1 is a schematic cross-sectional configuration view of a variable compression ratio engine, to which a drive apparatus for a brushless motor according to the present invention is applied.

FIG. 1 is a schematic cross-sectional configuration view of an engine, and illustrates a variable compression ratio engine, to which a drive apparatus for a brushless motor according to the present invention is applied. This engine 10 includes a variable compression ratio mechanism 100 that makes variable the top dead center position of a piston 12.

In variable compression ratio mechanism 100, a crankshaft 14 and piston 12 are coupled by a lower link 16 and an upper link 18, and a control link 20 regulates the movement of lower link 16, to change the top dead center position of piston 12, to thereby change the compression ratio. Changing the top dead center position of piston 12 to a higher position, or changing the top dead center position of piston 12 to approach a cylinder head 21, is referred to as an increase in compression ratio. Changing the top dead center position of piston 12 to a lower position, or changing the top dead center position of piston 12 to be away from cylinder head 21, is referred to as a decrease in compression ratio.

Lower link 16 is configured to be dividable into two members, a right member and a left member, and lower link 16 is attached to a crank pin 14b of crankshaft 14 through a coupling hole provided substantially at the center. Lower link 16 rotates around crank pin 14b as the axis.

Crankshaft 14 includes multiple journals 14a and crank pins 14b. Each journal 14a is rotatably supported by a cylinder block 22 and a ladder frame 24. Each crank pin 14b is decentered by a predetermined amount from journal 14a, and lower link 16 is rotatably coupled to the crank pin 14b.

One end of lower link 16 is coupled to upper link 18 through a coupling pin 26, and the other end of lower link 16 is coupled to control link 20 through a coupling pin 28.

The lower end of upper link 18 is coupled to the one end of lower link 16 through coupling pin 26, and the upper end of upper link 18 is coupled to piston 12 through a piston pin 30.

Piston 12 reciprocates in a cylinder 22a of cylinder block 22 due to the combustion pressure applied thereto.

One end of control link 20 is rotatably coupled to lower link 16 through coupling pin 28 arranged on the tip of the end. The other end of control link 20 is coupled to control shaft 36 through a coupling pin 32 in a decentralized manner. Thus, control link 20 oscillates about coupling pin 32 as the center.

On the outer periphery of control shaft 36, a gear is formed. The gear engages with a pinion 106 arranged on a rotating shaft 104 of an electric actuator 102. Electric actuator 102 drives control shaft 36 to rotate, and thereby, coupling pin 32 moves. Electric actuator 102 includes a built-in three-phase brushless motor (BLM) 112 as a power source. Brushless motor 112 is configured to rotate forward and backward. Thus, rotating shaft 104 and pinion 106, and ultimately control shaft 36, rotate forward and backward, and this makes it possible to have the top dead center position of piston 12 move to both the low compression ratio side and the high compression ratio side.

Furthermore, to a shaft end of control shaft 36, a rotational angle sensor (for example, a resolver sensor) 108 that measures an actual rotational angle that is a real rotational angle of control shaft 36, is connected. An actual rotational angle signal of an actual rotational angle measured by this rotational angle sensor 108 is output to a VCR controller 110. The actual rotational angle of control shaft 36 is a parameter corresponding to an actual top dead center position (real operating position) that is a real top dead center position of piston 12.

A main controller 42 controls fuel injection of a fuel injection device (fuel injection valve) 38 that directly injects fuel into the cylinder, and controls an ignition timing of a spark plug (spark coil) 40. This main controller 42 includes a microcomputer provided with a CPU, a ROM, a RAM, input and output interfaces, and the like. Main controller 42 receives measurement signals provided from various sensors, such as a load sensor 44 that measures engine load TP of engine 10, a rotation sensor 46 that measures rotational speed NE of engine 10, a water temperature sensor 48 that measures temperature (engine temperature) TW of coolant of engine 10. Main controller 42 outputs control signals (operation signals) of fuel ignition device 38, spark plug 40, or the like, based on the measurement signals from the various sensors.

Furthermore, main controller 42 estimates a load state of engine 10 (for example, an acceleration state of vehicle) based on the measurement signals from the various sensors. To lower VCR controller 110 communicatively connected via an on-board network, such as a controller area network (CAN), main controller 42 outputs a signal corresponding to a target top dead center position (target operating position), which is to be a target of the top dead center position of piston 12, that is, a signal of a target rotational angle of control shaft 36 in variable compression ratio mechanism 100, depending on the estimated load state of engine 10.

VCR controller 110 includes a microcomputer provided with a CPU, a ROM, a RAM, input and output interfaces, and the like. This VCR controller 110 controls electric actuator 102 (brushless motor 112) in variable compression ratio mechanism 100 to rotate control shaft 36, based on the actual rotational angle signal received from rotational angle sensor 108 and the target rotational angle signal of control shaft 36 received from main controller 42. This makes VCR controller 110 change the top dead center position of piston 12, to change the compression ratio (mechanical compression ratio) of engine 10 to a lower compression ratio or a higher compression ratio.

Specifically, VCR controller 110 sets a target current value of the current supplied to brushless motor 112 depending on a deviation between the actual rotational angle and the target rotational angle of control shaft 36, and performs a feedback control of the current based on a difference between the set target current value and an actual current value of the current actually flowing through brushless motor 112. This current feedback control is performed by a vector control on a d-q coordinate system that is a rotating orthogonal coordinate system. The d-q coordinate system is defined so that the direction of a field rotating in synchronization with a rotor that is a permanent magnet rotor, is aligned along the d axis, and the torque generation direction orthogonal to the d axis is aligned along the q axis.

Figure 2:
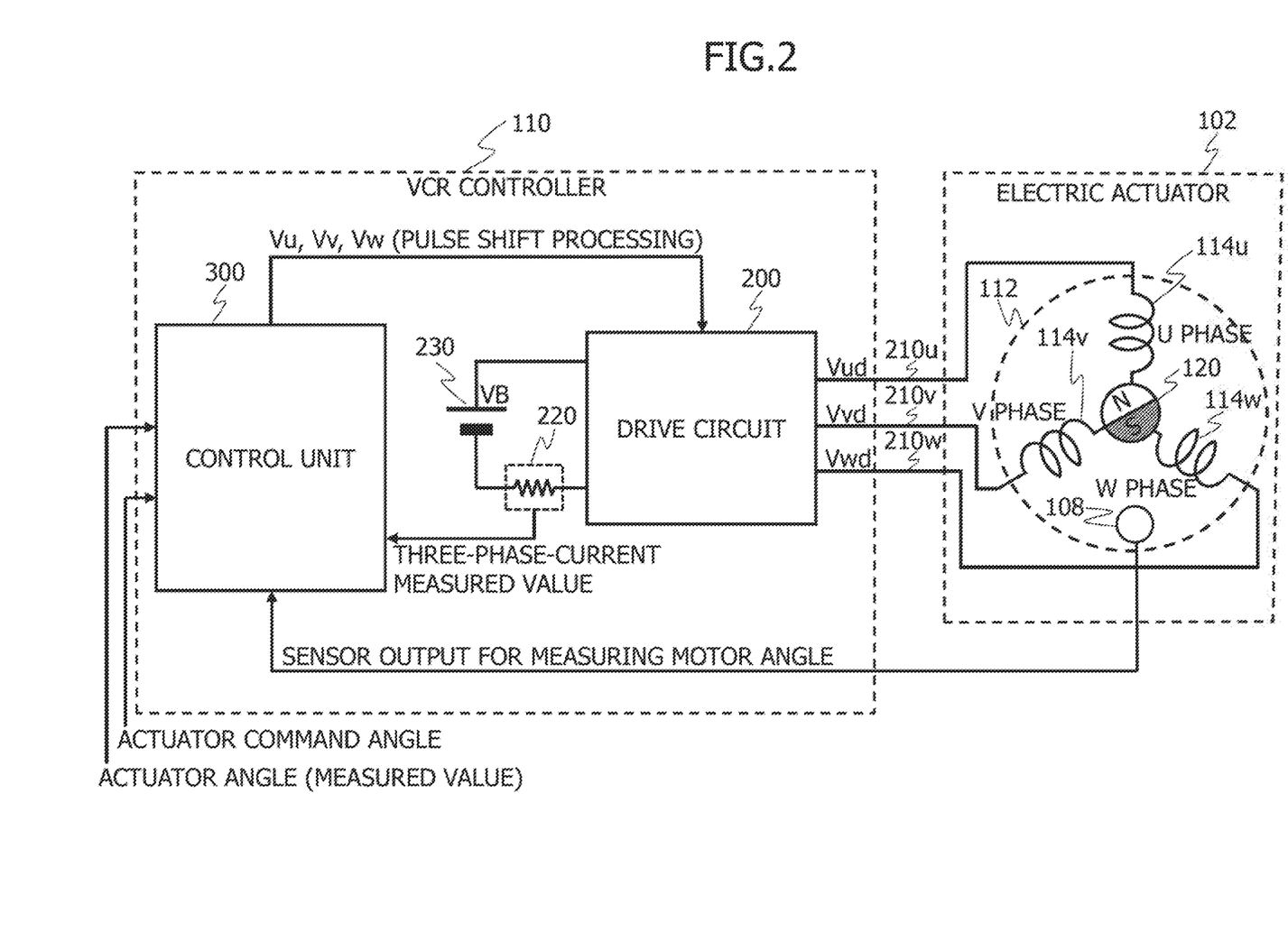
FIG. 2 is a block diagram for explaining a drive apparatus for a brushless motor according to an embodiment of the present invention, the diagram illustrating essential parts extracted from an electric actuator and a VCR controller illustrated in FIG. 1.

FIG. 2 illustrates an example of the structure by extracting essential parts from electric actuator 102 and VCR controller 110 in FIG. 1, involved in driving of the brushless motor. Electric actuator 102 includes built-in brushless motor 112. Brushless motor 112 includes: a cylindrical stator (not illustrated), in which U-phase, V-phase, and W-phase coils 114u, 114v, 114w are wound; and a rotor 120 that is a permanent magnet rotor rotatably provided at the center of the stator. The rotational position of rotor 120 is sensed by rotational angle sensor 108. One end of each of the coils 114u, 114v, 114w is commonly connected (star-connected), and each of the other ends is connected to the corresponding drive wire 210u, 210v, 210w of VCR controller 110. Brushless motor 112 may be a motor in which the three-phase coils 114u, 114v, 114w are connected by delta connection.

VCR controller 110 includes a drive circuit (inverter circuit) 200, a shunt resistor (one-shunt system) 220 that measures a phase current at the time of applying a voltage pulse to brushless motor 112, an on-board power supply 230, such as a battery, and a control unit 300. Control unit 300 generates gate voltages Vu, Vv, Vw for driving each switching element in drive circuit 200 to be turned on or off, based on an actuator command angle and an actuator angle (measured value) supplied from main controller 42, a three-phase-current measured value measured by shunt resistor 220, and an actual rotational angle signal (sensor output for measuring a motor angle) representing an actual rotational angle of brushless motor 112, measured by rotational angle sensor 108, and then, control unit 300 supplies gate voltages Vu, Vv, Vw to drive circuit 200.

Drive circuit 200 supplies three-phase terminal voltages Vud, Vvd, Vwd for driving brushless motor 112 under a pulse width modulation (PWM) control through the corresponding drive wires 210u, 210v, 210w.

Figure 3:
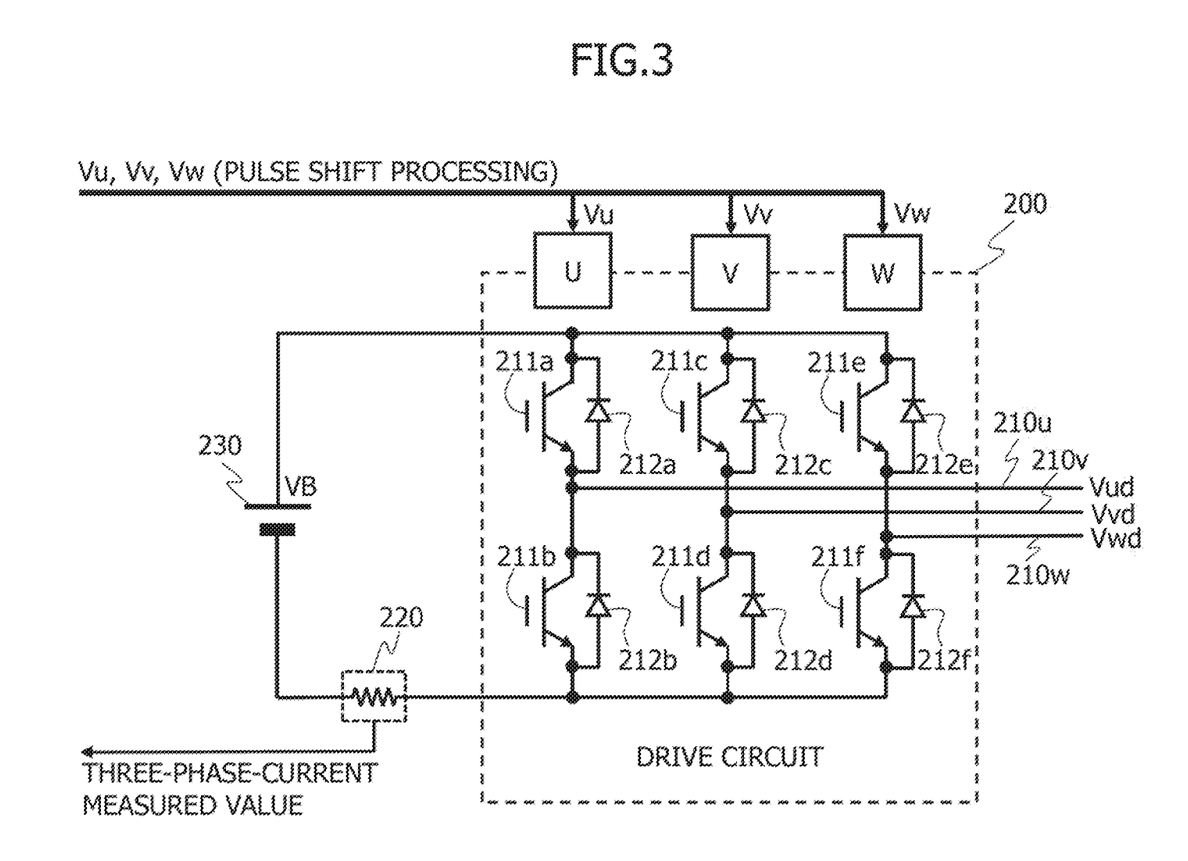
FIG. 3 is a circuit diagram illustrating an example of the structure of a drive circuit in the VCR controller of FIG. 2.

As illustrated in FIG. 3, drive circuit 200 includes a three-phase bridge circuit, each phase of which is provided with a pair of power semiconductor devices (switching elements 211a to 211f) for supplying power, and drive circuit 200 constitutes a power converter that converts the direct-current power supplied from on-board power source 230 into the alternating-current power, to supply the alternating-current power to brushless motor 112. Although each switching element 211a to 211f is constituted by an insulated gate bipolar transistor (IGBT) in this example, other semiconductor devices for controlling electric power such as a field effect transistors (FETs) may be used. Between the collector and the emitter of each IGBT, the cathode and the anode of a corresponding diode 212a to 212f are connected in a manner such that the direction of supplying power is reversed.

Control unit 300 supplies the control terminal (gate terminal) of each switching element 211a to 211f with the corresponding gate voltage Vu, Vv, Vw, to selectively drive switching element 211a to 211f to be turned on or off, and thereby, three-phase terminal voltages Vud, Vvd, Vwd for driving brushless motor 112 are generated. Then, at a timing at which these voltage pulses become voltage VB of on-board power supply 230, the phase current flowing through the three-phase bridge circuit is acquired by shunt resistor 220, and the three-phase-current measured value is supplied to control unit 300.

Figure 4:
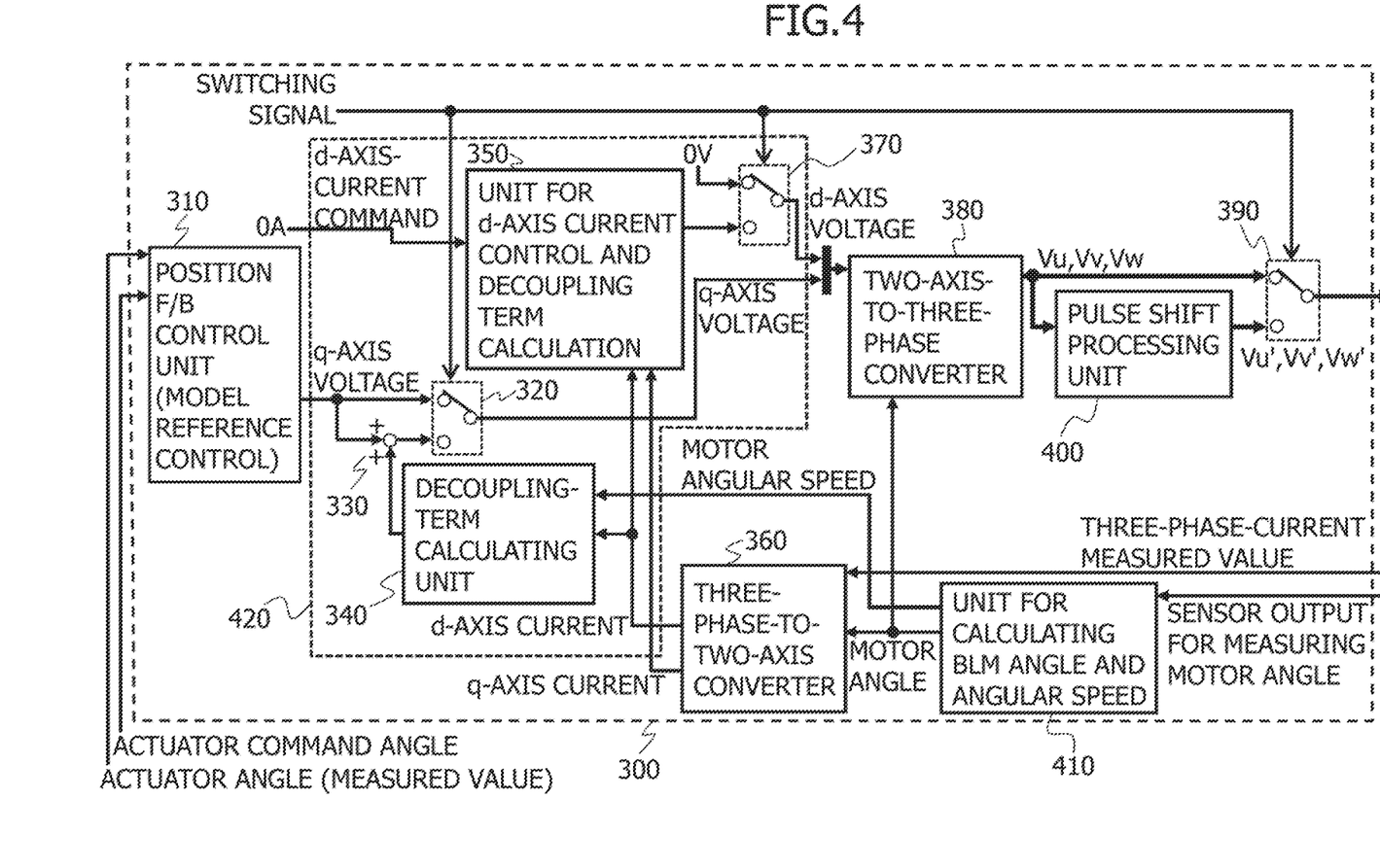
FIG. 4 is a functional block diagram illustrating an example of a control of a control unit in the VCR controller of FIG. 2.

FIG. 4 is a functional block diagram illustrating an example of a control performed by control unit 300. Conventionally, based on a command angle of an actuator and an actuator angle (measured value), a position feedback control (model reference control) is performed to obtain a q-axis voltage, and this voltage is converted into a current to generate a q-axis-current command, so as to perform a q-axis-current feedback in a vector control.

In contrast, according to the present embodiment, when the voltage pulse width in the corresponding drive wire 210u, 210v, 210w of brushless motor 112 is greater than a predetermined value, the pulse shift is performed, whereas when the voltage pulse width is less than the predetermined value, the pulse shift is not performed. Since the phase current cannot be measured when the pulse shift is not performed, the q-axis voltage of the position feedback control is used as it is, to achieve a control which does not require the current.

Thus, control unit 300 includes a position feedback (F/B) control unit 310 that outputs a q-axis voltage. Position feedback control unit 310 calculates the q-axis voltage based on the command angle of electric actuator 102 and the measured actuator angle, in order to control control shaft 36 in variable compression ratio mechanism 100. By using this q-axis voltage, the actual top dead center position is fed back to the target top dead center position of piston 12, to perform the model reference control for setting a manipulated amount of electric actuator 102 (brushless motor 112).

The q-axis voltage output from position feedback control unit 310 is input to a first fixed contact of a switching unit 320. Furthermore, the q-axis voltage is input to an adder 330, a decoupling term output from a decoupling-term calculating unit 340 is added to the q-axis voltage, and the resultant is input to a second fixed contact of switching unit 320. Switching unit 320 is controlled by a switching signal so that either of the output of position feedback control unit 310 and the output of adder 330 is selected. The switching signal is a signal representing whether the pulse width of three-phase terminal voltage Vud, Vvd, Vwd in drive wire 210u, 210v, 210w of brushless motor 112 is greater (or less) than the predetermined value.

A d-axis-current command is supplied to a unit 350 for d-axis current control and decoupling term calculation. Since this d-axis-current command is a reactive current component, the d-axis-current command is controlled to be 0 A; however, when a weak magnetic field is applied, the d-axis-current command is controlled to be −20 A. To unit 350 for d-axis current control and decoupling term calculation, a d-axis current and a q-axis current output from a three-phase-to-two-axis converter 360 are supplied. Unit 350 for d-axis current control and decoupling term calculation calculates a d-axis voltage based on the d-axis-current command, the d-axis current and the q-axis current, and corrects the d-axis voltage by adding the decoupling term.

A switching unit 370 has a first fixed contact, to which a voltage of 0 V is applied, and a second fixed contact, to which the output of unit 350 for d-axis current control and decoupling term calculation is supplied. Switching unit 370 is controlled by a switching signal so that either of 0 V and the output of unit 350 for d-axis current control and decoupling term calculation is selected. The q-axis voltage supplied through switching unit 320 and the d-axis voltage supplied through switching unit 370 are both supplied to a two-axis-to-three-phase converter 380. Two-axis-to-three-phase converter 380 performs two-axis-to-three-phase conversion based on a motor angle, to generate gate voltages Vu, Vv, Vw from the q-axis and d-axis voltages.

Gate voltages Vu, Vv, Vw generated in two-axis-to-three-phase converter 380 are supplied to a first fixed contact of a switching unit 390, and also supplied to a pulse shift processing unit 400, and then, voltages Vu', Vv', Vw', subjected to the pulse shift processing, are supplied to a second fixed contact of switching unit 390. Switching unit 390 is controlled by a switching signal so that either of gate voltages Vu, Vv, Vw and gate voltages Vu', Vv', Vw' are selected.

The actual rotational angle signal (sensor output for measuring the motor angle) that indicates the actual rotational angle of brushless motor 112 measured by rotational angle sensor 108, is input to a unit 410 for calculating a BLM angle and an angular speed, and thereby, a motor angle and a motor angular speed are calculated. The calculated motor angle is supplied to three-phase-to-two-axis converter 360 and two-axis-to-three-phase converter 380, and the calculated motor angular speed is supplied to decoupling-term calculating unit 340. Three-phase-to-two-axis converter 360 performs three-phase-to-two-axis conversion, based on the motor angle calculated by unit 410 for calculating the BLM angle and the angular speed, and the three-phase-current measured value measured by shunt resistor 220, to generate the d-axis current and the q-axis current.

The generated d-axis current is input to decoupling-term calculating unit 340 and unit 350 for d-axis current control and decoupling term calculation, and the generated q-axis current is input to unit 350 for d-axis current control and decoupling term calculation. Decoupling-term calculating unit 340 calculates the decoupling term, and the decoupling term is added to a voltage obtained in the control in the higher-level system (i.e., added to the output of position feedback control unit 310), to generate the q-axis voltage.

In FIG. 4, the region surrounded by broken line 420 corresponds to the conventional vector control unit.

In the configuration as described in the foregoing, when the pulse width of three-phase terminal voltage Vud, Vvd, Vwd in drive wire 210u, 210v, 210w of brushless motor 112 is greater than the predetermined value, the pulse shift is performed, whereas when the pulse width is less than the predetermined value, the pulse shift is not performed.

Case 1

A case in which the pulse shift is performed will be described. Regarding the q-axis voltage, a movable contact of switching unit 320 is made to connect to the first fixed contact by the switching signal, so that the output of position feedback control unit 310 is selected and the q-axis-current feedback is performed. Regarding the d-axis voltage, a movable contact of switching unit 370 is made to connect to the second fixed contact, so that the output of unit 350 for d-axis current control and decoupling term calculation is selected. The obtained q-axis and d-axis voltages are supplied to two-axis-to-three-phase converter 380, to generate gate voltages Vu, Vv, Vw, and the generated gate voltages Vu, Vv, Vw are supplied to pulse shift processing unit 400. Furthermore, a movable contact of switching unit 390 is made to connect to the second fixed contact by the switching signal, so that the output of pulse shift processing unit 400 is selected, and voltages Vu', Vv', Vw' subjected to the pulse shift processing are supplied to coils 114u, 114v, 114w of brushless motor 112, respectively, through the corresponding drive wires 210u, 210v, 210w.

Next, a case in which the pulse shift is not performed will be described. Regarding the q-axis voltage, the movable contact of switching unit 320 is made to connect to the first fixed contact by the switching signal, so that the output of position feedback control unit 310 is selected and the q-axis-current feedback is performed. Regarding the d-axis voltage, the movable contact of switching unit 370 is made to connect to the first fixed contact, so that 0 V is input as the d-axis voltage. The obtained q-axis and d-axis voltages are supplied to two-axis-to-three-phase converter 380, to generate gate voltages Vu, Vv, Vw. Then, the movable contact of switching unit 390 is made to connect to the first fixed contact by the switching signal, so that the output of two-axis-to-three-phase converter 380 is selected, and the generated gate voltages Vu, Vv, Vw are supplied to coils 114u, 114v, 114w of brushless motor 112, respectively, through the corresponding drive wires 210u, 210v, 210w.

Thus, in this Case 1, during the pulse shift, the q-axis voltage is changed back to current to obtain the q-axis current, and thereby, the q-axis-current feedback is performed in the vector control.

Case 2

A case in which the pulse shift is performed will be described. Regarding the q-axis voltage, the movable contact of switching unit 320 is made to connect to the second fixed contact by the switching signal, so that the output of adder 330 is selected, and thus, the voltage obtained by adding the q-axis voltage of the reference model and the decoupling term is selected. Regarding the d-axis voltage, the movable contact of switching unit 370 is made to connect to the second fixed contact, so that the output of unit 350 for d-axis current control and decoupling term calculation is selected. The obtained q-axis and d-axis voltages are supplied to two-axis-to-three-phase converter 380, to generate gate voltages Vu, Vv, Vw, and the generated gate voltages Vu, Vv, Vw are supplied to the pulse shift processing unit 400. Then, the movable contact of switching unit 390 is made to connect to the second fixed contact by the switching signal, so that the output of pulse shift processing unit 400 is selected, and voltages Vu', Vv', Vw' subjected to the pulse shift processing are supplied to coils 114u, 114v, 114w of brushless motor 112, respectively, through the corresponding drive wires 210u, 210v, 210w.

Next, a case in which the pulse shift is not performed will be described. Regarding the q-axis voltage, the movable contact of switching unit 320 is made to connect to the second fixed contact by the switching signal, so that the output of adder 330 is selected, and thus, the voltage obtained by adding the q-axis voltage of the reference model and the decoupling term is selected. Regarding the d-axis voltage, the movable contact of switching unit 370 is made to connect to the first fixed contact, so that 0 V is input as the d-axis voltage. The obtained q-axis and d-axis voltages are supplied to two-axis-to-three-phase converter 380, to generate gate voltages Vu, Vv, Vw. Then, the movable contact of switching unit 390 is made to connect to the first fixed contact by the switching signal, so that the output of two-axis-to-three-phase converter 380 is selected, and the generated gate voltages Vu, Vv, Vw are supplied to coils 114u, 114v, 114w of brushless motor 112, respectively, through the corresponding drive wires 210u, 210v, 210w.

Thus, regardless of the presence or absence of the pulse shift, the q-axis-current feedback is not performed, and accordingly, the control is always carried out using the q-axis voltage as it is.

Figure 5:
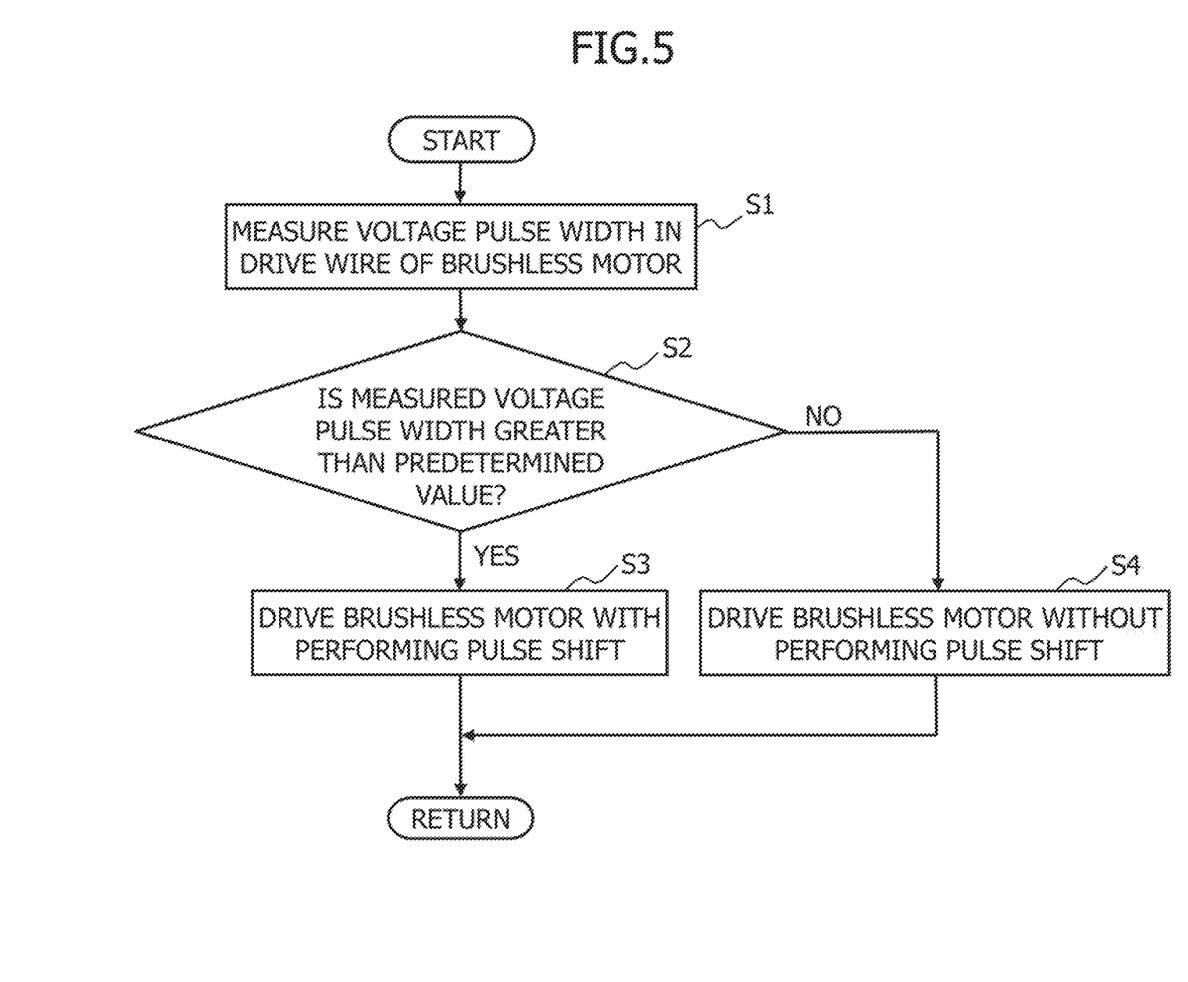
FIG. 5 is a flowchart for explaining a drive method of a brushless motor according to an embodiment of the present invention.

FIG. 5 illustrates a flowchart for explaining a drive method of a brushless motor according to an embodiment of the present invention. In FIG. 5, a procedure for measuring the phase current in the one-shunt system is described. First, the pulse width of voltage Vu, Vv, Vw in drive wire 210u, 210v, 210w of brushless motor 112 is measured (step S1). Next, the measured voltage pulse width and the predetermined value stored in advance in a storage unit of VCR controller 110 (or alternatively, main controller 42) are compared (step S2).

Then, when the measured voltage pulse width is greater than the predetermined value, brushless motor 112 is driven with the pulse shift performed (step S3), whereas when the measured voltage pulse width is less than the predetermined value, brushless motor 112 is driven without performing the pulse shift (step S4). At this time, since the phase current cannot be measured when the pulse shift is not performed, as described above, the control which does not require the current is carried out by using the q-axis voltage of the position feedback control as it is.

As described above, in the present embodiment, the vector control in which the d-axis and q-axis currents are both controlled is not carried out, and the q-axis voltage is determined based on the voltage obtained by main controller 42 in the higher level. Regarding the q-axis current, when the pulse width of voltage applied to brushless motor 112 is short (the duty cycle is low), the current measurement is not carried out and the d-axis voltage is set to 0 [V], whereas when the duty cycle is not low, the current measurement is carried out to perform the current feedback control.

Thus, even when ringing occurs in the phase current at the time of applying the voltage pulse in the one-shunt system, it is possible to perform the current measurement at the timing at which the ringing is stopped by the pulse shift processing, and thus, the accurate current value sufficient for use in the vector control can be acquired. On the other hand, when the voltage pulse width is less than the predetermined value, it is possible to reduce noise by eliminating the pulse shift.

Figure 6A:
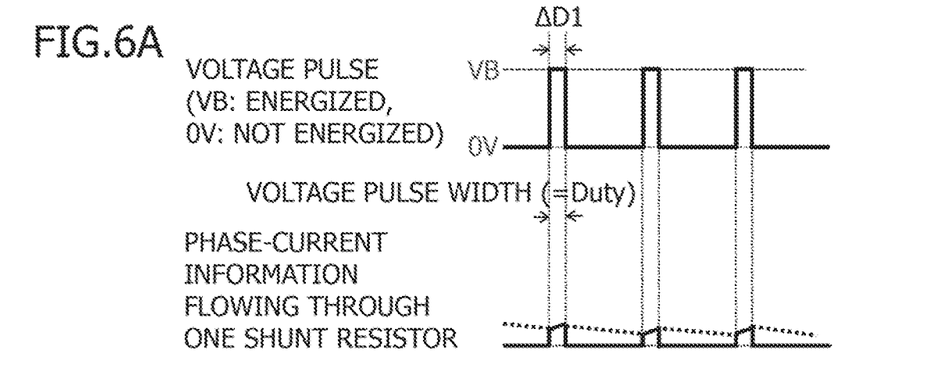
FIG. 6A is a waveform chart for explaining acquisition of phase-current information when pulse shift processing is performed.
Figure 6B:
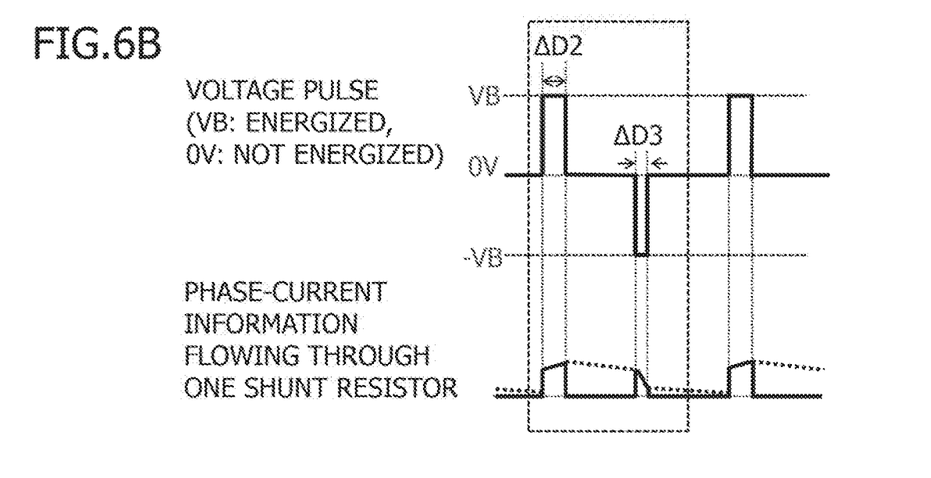
FIG. 6B is a waveform chart for explaining acquisition of phase-current information when the pulse shift processing is performed.
Figure 6C:
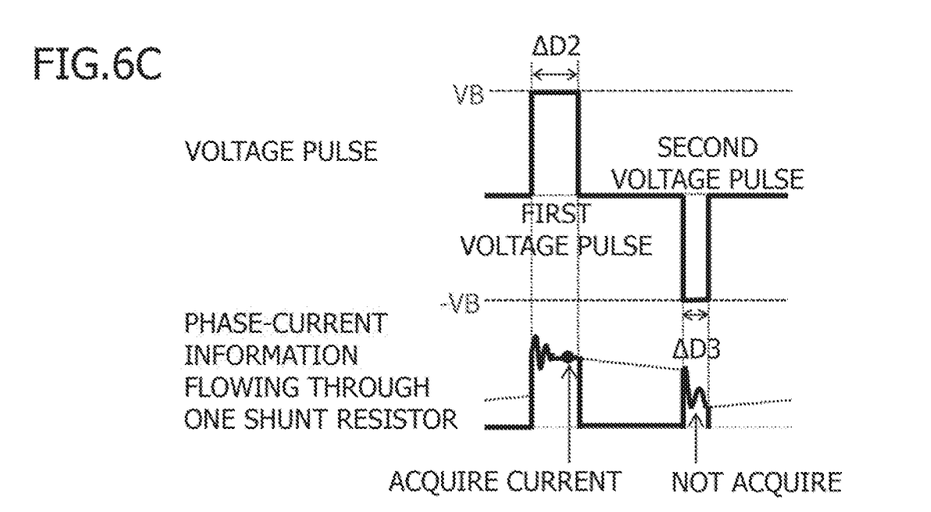
FIG. 6C is a waveform chart for explaining acquisition of phase-current information when the pulse shift processing is performed.

FIGS. 6A to 6C are waveform charts, each explaining acquisition of phase-current information when the pulse shift processing is performed. As illustrated in FIG. 6A, when desired voltage pulse width (=Duty) ΔD1 is short, the phase current flows through shunt resistor 220 only in a short time, and thus, the phase current-information is largely affected by the ringing, resulting in a decrease in measurement accuracy of the phase current.

Thus, as illustrated in FIG. 6B, first, a voltage pulse having as minimum a duty width ΔD2 as possible, to reliably acquire the phase current, is applied, to acquire the phase current, and then, as the second voltage pulse, a voltage pulse having corrected duty width ΔD3 is applied (a voltage pulse in a counter torque direction may occur in some cases) without acquiring phase current-information. In this case, corrected duty width ΔD3 is "ΔD3=2×ΔD1−ΔD2".

FIG. 6C is an enlarged view illustrating the region surrounded by broken line in FIG. 6B. At the first voltage pulse, the phase-current information is acquired after the ringing stops. Since the second voltage pulse is affected by the ringing, no phase-current information is acquired. Thus, desired duty width ΔD1 can be achieved by the average of two voltage pulses applied in succession.

Figure 7:
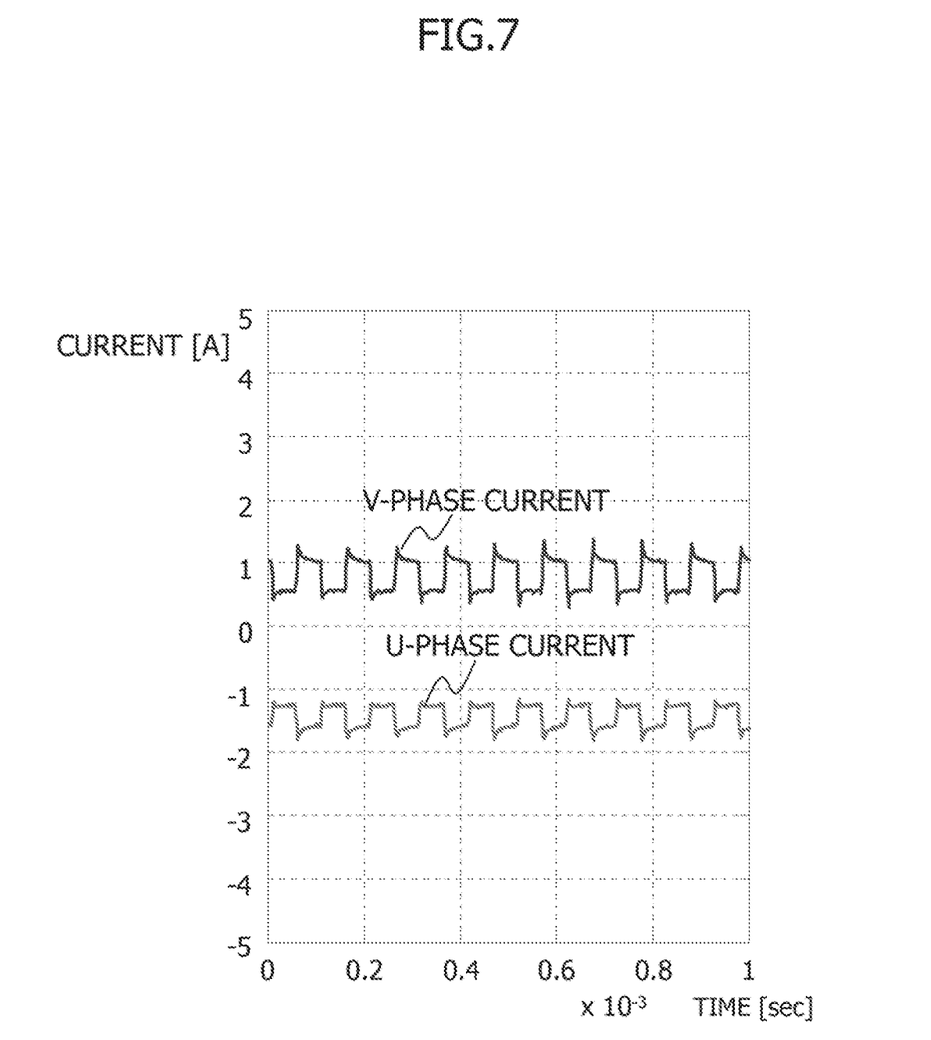
FIG. 7 is a waveform chart illustrating the V-phase current and the U-phase current when the pulse shift is performed.
Figure 8:
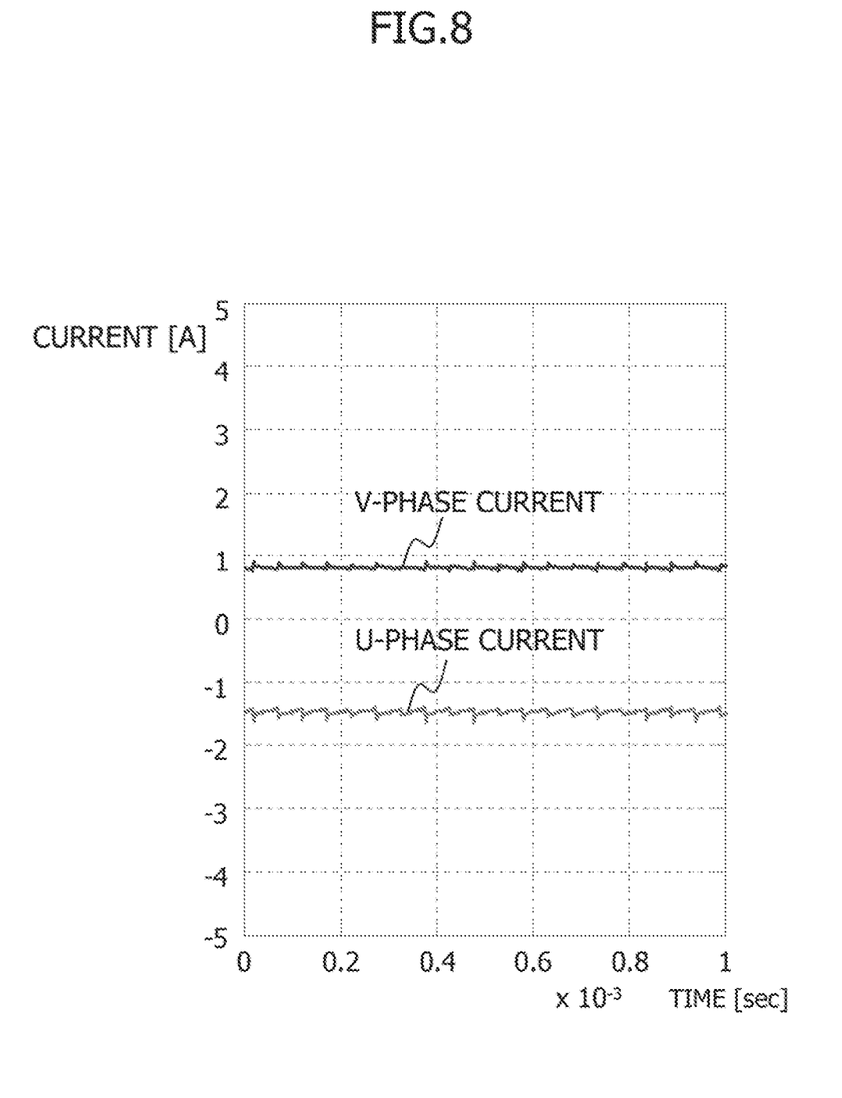
FIG. 8 is a waveform chart illustrating the V-phase current and the U-phase current when the pulse shift is not performed.

FIG. 7 is a waveform chart illustrating the V-phase current and the U-phase current when the pulse shift is performed, and FIG. 8 is a waveform chart illustrating the V-phase current and the U-phase current when the pulse shift is not performed. As illustrated in FIG. 7, when the duty cycle of the voltage applied to brushless motor 112 is low (low voltage), oscillation of the current occurs due to the pulse shift and generates buzzing noise. However, since the pulse shift is not performed, the oscillation of the current during the constant-angle control can be reduced, so that it is possible to reduce the noise, as illustrated in FIG. 8.

The present invention is not limited to the embodiments described in the foregoing, and various modifications can be made without departing from the gist of the invention.

Modification 1

For example, although the state in which the pulse shift is performed and the state in which the pulse shift is not performed are switched based on the pulse width of three-phase terminal voltage Vud, Vvd, Vwd in drive wire 210u, 210v, 210w of brushless motor 112 in the above embodiment, the switching may be controlled by a signal corresponding to the operation request of electric actuator 102.

Furthermore, the state in which the pulse shift is performed and the state in which the pulse shift is not performed may be switched based on comparison of a deviation between a position command value and a sensed position of electric actuator 102, with a predetermined value, or the state in which the pulse shift is performed and the state in which the pulse shift is not performed may be switched based on an instruction value and an actual value of the engine compression ratio. Furthermore, it may be switched based on the combination thereof.

Modification 2

In addition, the state in which the d-axis- and q-axis-current feedback controls are performed and the state in which the d-axis- and q-axis-current feedback controls are not performed may be switched based on whether or not the pulse shift is performed, and the d-axis-current feedback control is not performed when the d-axis voltage is less than or equal to a predetermined value.

Modification 3

In addition, in a case in which a weak-field control is performed, when the command value of the d-axis current becomes 0 A, the d-axis-current feedback control may be switched from a state of being performed to a state of not being performed.

Modification 4

As switching conditions of the d-axis voltage in a case in which the pulse shift is switched to the state of not being performed during performing the pulse shift, in addition to the above conditions, the d-axis voltage is switched to 0 V when the d-axis voltage becomes 0 V or the polarity is changed.

Alternatively, since there can be a situation in which the d-axis-current command value is 0 A, or the command sets the d-axis current to that other than 0 A (although the d-axis current is set to 0 A, in general) under a weak field during the pulse shift, the pulse shift may be switched to the state of not being performed when the d-axis current returns to 0 A.

REFERENCE SYMBOL LIST

10 Engine
42 Main controller
100 Variable compression ratio mechanism
102 Electric actuator
108 Rotational angle sensor
110 VCR controller
112 Brushless motor
114u, 114v, 114w Coils
200 Drive circuit
210u, 210v, 210w Drive wires
211a-211f Switching elements
220 Shunt resistor
230 On-board power supply
300 Control unit
Vu, Vv, Vw Gate voltages
Vud, Vvd, Vwd Three-phase terminal voltages
310 Position feedback control unit
320 Switching unit
330 Adder
340 Decoupling-term calculating unit
350 Unit for d-axis current control and decoupling term calculation
360 Three-phase-to-two-axis converter
370 Switching unit
380 Two-axis-to-three-phase converter 390 Switching unit
400 Pulse shift processing unit
410 Unit for calculating BLM angle and angular speed

The invention claimed is:

1. A drive apparatus for a three-phase brushless motor, comprising:
   a shunt resistor for measuring a phase current of the brushless motor; and
   a controller that measures the phase current of the brushless motor in a one-shunt system by using the shunt resistor, and controls driving of the brushless motor based on the measured phase current, in which the controller performs pulse shift when a voltage pulse width in a drive wire of the brushless motor is greater than a predetermined value, whereas the controller does not perform the pulse shift when the voltage pulse width is less than the predetermined value;
   wherein the controller comprises a drive circuit that drives the brushless motor, and a control unit that controls the drive circuit; and
   wherein the control unit includes a pulse shift processing unit that performs pulse shift processing, wherein the pulse shift processing unit corrects a voltage with a first correction amount during a monotonically increasing period of a triangular-wave carrier, and corrects the corrected voltage with a second correction amount during a monotonically decreasing period following the monotonically increasing period, so that an average of the first and second correction amounts becomes zero.

2. The drive apparatus for the brushless motor, according to claim 1, wherein the drive circuit comprises a three-phase bridge circuit, each phase of which is provided with a pair of switching elements, the drive circuit converting a direct-current power supplied from a power source into an alternating-current power, to supply the alternating-current power to the brushless motor.

3. The drive apparatus for the brushless motor, according to claim 2, wherein the shunt resistor is connected between the three-phase bridge circuit and the power source.

4. The drive apparatus for the brushless motor, according to claim 3, wherein the control unit performs current measurement by the shunt resistor when a voltage pulse is applied to the brushless motor.

5. The drive apparatus for the brushless motor, according to claim 1, wherein the brushless motor is a power source of an electric actuator for use in an engine, and switches between a state in which the pulse shift is performed and a state in which the pulse shift is not performed, based on an operation request of the electric actuator.

6. The drive apparatus for the brushless motor, according to claim 5, wherein the electric actuator for use in the engine is applied to a mechanism for varying a compression ratio of a variable compression ratio engine.

7. The drive apparatus for the brushless motor, according to claim 6, wherein the control unit controls the drive circuit based on the compression ratio of the variable compression ratio engine, to switch between the state in which the pulse shift is performed and the state in which the pulse shift is not performed.

8. The drive apparatus for the brushless motor, according to claim 5, wherein the control unit controls the drive circuit based on comparison of a deviation between a position command value and a sensed position of the electric actuator, with a predetermined value, to switch between the state in which the pulse shift is performed and the state in which the pulse shift is not performed.

9. The drive apparatus for the brushless motor, according to claim 1, wherein the control unit switches between a state in which d-axis- and q-axis-current feedback controls are performed and a state in which the d-axis- and q-axis-current feedback controls are not performed, based on whether or not the pulse shift is performed.

10. The drive apparatus for the brushless motor, according to claim 9, wherein the control unit makes the d-axis-current feedback control not performed when a d-axis voltage is less than or equal to a predetermined value.

11. The drive apparatus for the brushless motor, according to claim 9, wherein in a case in which a weak field control is performed, the control unit switches from a state in which the d-axis-current feedback control is performed to a state in which the d-axis-current feedback control is not performed, when a command value of a d-axis current becomes 0 A.

12. The drive apparatus for the brushless motor, according to claim 1, wherein the control unit generates a q-axis voltage by adding a decoupling term to a voltage obtained in a control in a higher-level system.

13. A method for driving a three-phase brushless motor by measuring a phase current in a one-shunt system, the method comprising the steps of:
    measuring a voltage pulse width in a drive wire of the brushless motor;
    comparing the measured voltage pulse width with a predetermined value; and
    performing pulse shift when the measured voltage pulse width is greater than the predetermined value, whereas not performing the pulse shift when the measured voltage pulse width is less than the predetermined value;
    wherein performing the pulse shift comprises correcting a voltage during a monotonically increasing period of a triangular-wave carrier, subtracting the correction amount from the corrected voltage during a monotonically decreasing period following the monotonically increasing period, so that an averaged voltage becomes zero, to perform a current measurement.

14. The method for driving the brushless motor, according to claim 13, wherein comparing the measured voltage pulse width with the predetermined value comprises comparing the measured voltage pulse width with a predetermined value stored in advance in a storage unit.

15. The method for driving the brushless motor, according to claim 13, wherein the brushless motor is a power source of an electric actuator for use in an engine, and switches between a state in which the pulse shift is performed and a state in which the pulse shift is not performed, based on an operation request of the electric actuator.

16. The method for driving the brushless motor, according to claim 15, wherein the electric actuator for use in the engine is applied to a mechanism for varying a compression ratio of a variable compression ratio engine.

17. The method for driving the brushless motor, according to claim 16, wherein the state in which the pulse shift is performed and the state in which the pulse shift is not performed are switched based on the compression ratio of the variable compression ratio engine.

* * * * *